S. F. ESTELL.
Animal-Traps.

No. 135,534.   Patented Feb. 4, 1873.

Witnesses.  
W. A. Mote.  
J. J. Russell.

Inventor,  
Samuel F. Estell.

UNITED STATES PATENT OFFICE.

SAMUEL F. ESTELL, OF CHICAGO, ILLINOIS, ASSIGNOR TO ANDREW W. KENDRICK, OF BROOKLYN, NEW YORK, AND HARRISON OGBORN, OF RICHMOND, INDIANA.

IMPROVEMENT IN ANIMAL-TRAPS.

Specification forming part of Letters Patent No. 135,534, dated February 4, 1873.

*To all whom it may concern:*

Be it known that I, SAMUEL F. ESTELL, of Chicago, Illinois, have invented new and useful Improvements in Animal-Traps, of which the following is a specification:

My invention relates to a new and useful improvement in the construction of animal-traps whereby they are more easily set and safely held in position until released by the animal pulling at the bait, consisting, in part, of a wire which answers the purpose of a spring and catch and part of the trigger, whereby the trap is more readily, surely, quickly, and easily set by inexperienced persons; also, avoiding the danger and annoyance of the trap being accidentally sprung.

Figure 1:
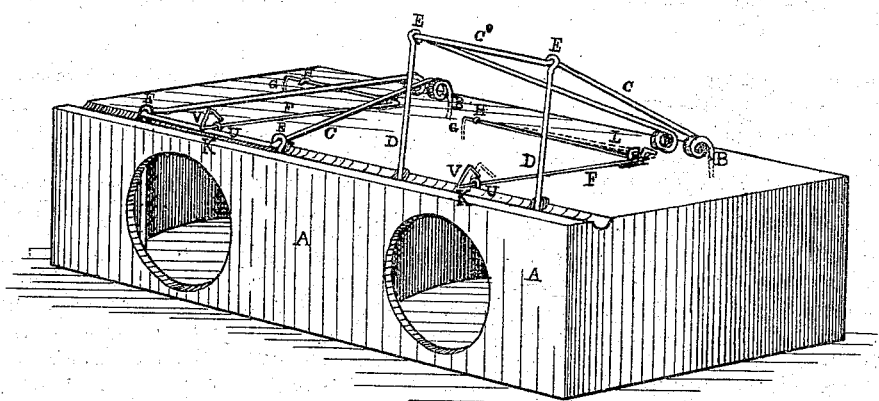
Figure 2:
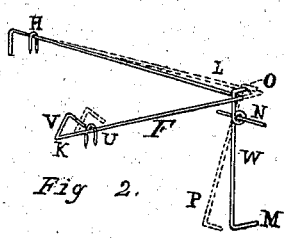

Figure 1 is a perspective view of my invention with two traps shown, one set, the other not. Fig. 2 is a perspective view of the spring F, inclined portion K, catch V, and wire W.

A is the body of an ordinary trap, made of suitable size for rats, mice, or other animals. Attached to it at B B are the spring-wires C C, to which the ends of the wire D are attached, at E E. F is a spring. K is an inclined portion, and V a catch. These are always in the same position except at the moment the trap is either set or sprung. This wire F has a square bend at its end, shown in dotted lines, which is driven into the trap G to hold it. It is further held down on the wood loosely by a staple, U, near the inclined portion K; also by a staple, H, passing over it and holding it securely, which is set enough out of line toward the front to cause the catch V to spring forward. When the wire C is pushed downward it comes in contact with the inclined portion K on the spring F and pushes it back into the position shown in dotted lines L until the wire C has slipped past, when it returns, thus holding it in position. M is a bait-hook on one end of wire W; the other end forms the hook O, it being hung on the wire N in the usual way, as shown in the drawing. The hook O engages with the spring F and releases the trap-spring by a slight pressure on the bait-hook, drawing it to the dotted line P.

In using my trap, to set it, it is only necessary to push the wire C downward, by which the spring is pushed back by the wire C sliding down the inclined portion, and when wire C is pushed down firmly onto the body of the trap the catch V slips over it and holds it firmly until the animal draws on the bait. The catch F is then drawn back so that the spring C is released, and it springs up at once, thus catching and holding the animal firmly.

I claim as my invention—

1. The spring F, catch K, and inclined portion V, combined for the purposes and in the manner substantially as set forth.

2. The spring F, catch K, and inclined portion V, in combination with the staples H and U and wires C D, trap A, hooks M and O, and wire N, substantially as set forth, and in the manner indicated.

SAMUEL F. ESTELL.

Witnesses:
   ISAAC H. PEDRICK,
   JOHN S. MALTMAN.